(12) United States Patent
Brandenburger et al.

(10) Patent No.: US 9,150,336 B2
(45) Date of Patent: Oct. 6, 2015

(54) CLOSURE CAP FOR A CONTAINER FOR RECEIVING LIQUIDS AND IN PARTICULAR AN ENTERAL NUTRIENT SOLUTION, AND CONTAINER HAVING SUCH A CLOSURE CAP

(75) Inventors: Torsten Brandenburger, Reichelsheim (DE); Gerhard Greier, Friedrichsdorf (DE); Ismael Rahimy, Friedberg (DE)

(73) Assignee: FRESENIUS KABI DEUTSCHLAND GMBH, Bad Homburg (DE)

( * ) Notice: Subject to any disclaimer, the term of this patent is extended or adjusted under 35 U.S.C. 154(b) by 293 days.

(21) Appl. No.: 12/599,723

(22) PCT Filed: May 20, 2008

(86) PCT No.: PCT/EP2008/004016
§ 371 (c)(1),
(2), (4) Date: Nov. 11, 2009

(87) PCT Pub. No.: WO2008/141794
PCT Pub. Date: Nov. 27, 2008

(65) Prior Publication Data
US 2010/0308056 A1   Dec. 9, 2010

(30) Foreign Application Priority Data

May 24, 2007 (DE) .......................... 10 2007 024 539

(51) Int. Cl.
*B65D 43/20* (2006.01)
*A61J 1/00* (2006.01)
(Continued)

(52) U.S. Cl.
CPC .............. *B65D 47/38* (2013.01); *A61J 1/2096* (2013.01); *B65D 51/002* (2013.01);
(Continued)

(58) Field of Classification Search
CPC ......... A61J 1/14; A61J 1/1406; A61J 1/1412; A61J 1/1475; A61J 1/20; A61J 2001/1412; A61J 2001/1418; A61J 2001/1431; A61J 2001/1475; A61J 2001/1481; A61J 2001/1487; A61J 2001/2006; A61J 2001/201; A61J 2001/2051; A61J 2001/2055; A61J 2001/2065; B65D 47/38; B65D 51/20; B65D 51/223; B65D 51/226; B65D 51/002; B65D 41/20; B65D 41/205; B65D 41/28; B65D 41/30; B65D 41/50; B65D 41/505; B65D 47/36; B65D 17/00; Y10S 215/03; B29L 2031/56; B29L 2031/565
USPC .................. 604/411, 415, 403, 407, 414, 416
See application file for complete search history.

(56) References Cited

U.S. PATENT DOCUMENTS 2,289,677 A    7/1942  Perelson
3,542,240 A *  11/1970 Solowey ......................... 222/83
(Continued)

FOREIGN PATENT DOCUMENTS

CA      2584384      *  4/2006
DE    19615422 A1    11/1997
(Continued)

OTHER PUBLICATIONS

DE19858237C2—translation Apr. 14, 2015.*

*Primary Examiner* — Adam Marcetich
(74) *Attorney, Agent, or Firm* — Occhiuti & Rohlicek LLP

(57) ABSTRACT

The closure cap according to the invention for a container for receiving liquids, and in particular a BFS container for receiving an enteral nutrient solution, has a cover part and a rim part, with a withdrawal part for the withdrawal of a liquid, and in particular the enteral nutrient solution, being arranged in the cover part. Basically, the closure cap according to the invention may also comprise, as well as the withdrawal part, an injection part for the injection of a medicinal liquid into the enteral nutrient solution. The withdrawal part of the closure cap according to the invention has a connecting part for a spike of a flexible line of a transfer device and a closing-off part having a pierceable membrane for closing-off the recess in the connecting part.

21 Claims, 4 Drawing Sheets

(51) Int. Cl.

| | | |
|---|---|---|
| *A61J 1/05* | (2006.01) | |
| *B65D 41/20* | (2006.01) | |
| *B65D 47/38* | (2006.01) | |
| *A61J 1/20* | (2006.01) | |
| *B65D 51/00* | (2006.01) | |
| *B65D 51/22* | (2006.01) | |
| *A61J 1/14* | (2006.01) | |
| *B29L 31/56* | (2006.01) | |

(52) U.S. Cl.
CPC .......... *B65D 51/223* (2013.01); *B65D 51/226* (2013.01); *A61J 1/1406* (2013.01); *A61J 1/1412* (2013.01); *A61J 1/1418* (2015.05); *A61J 1/1475* (2013.01); *A61J 1/1481* (2015.05); *A61J 1/201* (2015.05); *B29L 2031/56* (2013.01); *B29L 2031/565* (2013.01); *B65D 2101/0023* (2013.01)

(56) References Cited

U.S. PATENT DOCUMENTS

| | | | | |
|---|---|---|---|---|
| 3,904,060 | A * | 9/1975 | McPhee | 215/251 |
| 3,905,368 | A * | 9/1975 | Lewis et al. | 604/415 |
| 4,076,027 | A * | 2/1978 | Koenig | 604/406 |
| 4,153,173 | A * | 5/1979 | Ward et al. | 215/232 |
| 4,227,954 | A * | 10/1980 | Ward et al. | 156/250 |
| 4,328,802 | A | 5/1982 | Curley et al. | |
| RE31,082 | E * | 11/1982 | Winchell | 215/232 |
| 4,501,372 | A * | 2/1985 | Hansen | 215/247 |
| 4,898,209 | A * | 2/1990 | Zbed | 137/614.04 |
| 5,025,955 | A * | 6/1991 | Stenger | 222/82 |
| 5,071,017 | A * | 12/1991 | Stull | 215/260 |
| 5,088,995 | A * | 2/1992 | Packard et al. | 604/415 |
| 5,088,996 | A * | 2/1992 | Kopfer et al. | 604/415 |
| 5,342,316 | A * | 8/1994 | Wallace | 604/167.02 |
| 5,395,365 | A * | 3/1995 | Weiler et al. | 604/415 |
| 5,678,713 | A * | 10/1997 | Derksen | 215/249 |
| 5,779,074 | A * | 7/1998 | Burns | 215/247 |
| 5,853,094 | A * | 12/1998 | Tanaka et al. | 215/247 |
| 6,022,339 | A * | 2/2000 | Fowles et al. | 604/411 |
| 6,139,534 | A * | 10/2000 | Niedospial et al. | 604/411 |
| 6,183,465 | B1 * | 2/2001 | Meier et al. | 604/535 |
| 6,426,046 | B1 * | 7/2002 | Cassells et al. | 422/570 |
| 6,485,479 | B1 | 11/2002 | Knierbein | |
| 6,562,300 | B2 * | 5/2003 | Rosen et al. | 422/550 |
| 6,568,439 | B1 * | 5/2003 | Se et al. | 141/301 |
| 6,605,076 | B1 * | 8/2003 | Jepson et al. | 604/539 |
| 6,709,424 | B1 * | 3/2004 | Knierbein | 604/411 |
| 2002/0128612 | A1 * | 9/2002 | Andersson et al. | 604/256 |
| 2004/0035816 | A1 * | 2/2004 | Okiyama | 215/247 |
| 2004/0068239 | A1 * | 4/2004 | Utterberg et al. | 604/256 |
| 2004/0153047 | A1 * | 8/2004 | Blank et al. | 604/408 |
| 2004/0211484 | A1 * | 10/2004 | Fournie et al. | 141/329 |
| 2005/0215943 | A1 * | 9/2005 | Brandenburger et al. | 604/30 |
| 2006/0138069 | A1 * | 6/2006 | Domkowski et al. | 215/247 |
| 2006/0235364 | A1 * | 10/2006 | O'Hare et al. | 604/411 |
| 2006/0287638 | A1 * | 12/2006 | Aneas | 604/411 |
| 2007/0060904 | A1 * | 3/2007 | Vedrine et al. | 604/411 |
| 2007/0183937 | A1 * | 8/2007 | Sarstedt | 422/102 |
| 2008/0053565 | A1 * | 3/2008 | Py et al. | 141/329 |
| 2009/0192484 | A1 * | 7/2009 | Domkowski et al. | 604/403 |

FOREIGN PATENT DOCUMENTS

| | | |
|---|---|---|
| DE | 19858237 A1 | 6/2000 |
| DE | 60004082 T2 | 4/2004 |
| DE | 202004003267 U1 | 6/2004 |
| DE | 102004033205 A1 | 2/2006 |
| EP | 1010412 A2 | 6/2000 |
| WO | WO 2006/005391 A1 | 1/2006 |

* cited by examiner

CLOSURE CAP FOR A CONTAINER FOR RECEIVING LIQUIDS AND IN PARTICULAR AN ENTERAL NUTRIENT SOLUTION, AND CONTAINER HAVING SUCH A CLOSURE CAP

FIELD OF INVENTION

The invention relates to a closure cap for a container for receiving liquids, and in particular for a container for receiving a liquid for enteral nutrition, which has a cover part and a rim part. As well as this, the invention also relates to a container for receiving a liquid for enteral nutrition, and in particular a BFS container, which has such a closure cap.

BACKGROUND OF THE INVENTION

There is a process, known as the blow-fill-seal process (BFS process), in which, in a single operation and sterilely and while remaining pyrogen-free, containers, such for example as bottles of extruded PE or PP, are blown to a desired shape and immediately on cooling are filled aseptically with a sterile filling and are hermetically sealed. The containers, and in particular the bottles, which are produced by the blow-fill-seal process are also referred to as BFS containers.

When known BFS containers are used to receive sterile medical liquids, such for example as enteral nutrient solutions, they require a closure cap system which allows the enteral nutrient solution to be transferred to the patient by means of a transfer device.

To allow enteral nutrient solutions to be supplied, there are known nutrient solution bags which have a connecting part referred to as a port to which a transfer device for feeding the nutrient solution to the patient can be connected.

The known transfer devices for feeding the enteral nutrient solution to the patient have a flexible line which is provided at one end with a spike which can be connected to the connecting part of the nutrient solution bag. The other end of the flexible line is provided with a connector for connection to a probe for enteral nutrition.

The known connecting parts of known nutrient solution bags are closed off with a seal by a membrane which is pierced by the spike of the transfer device when the flexible line is connected in.

Known from DE 2 00 U1 is a closure cap for a BFS container which has a cover part and a rim part, a slit membrane which allows the spike of a transfer device to be inserted being inset into the cover part. The slit membrane is seated in the cover part of the closure cap flush therewith.

The object underlying the invention is to provide a closure cap for a container for receiving liquids, and in particular a BFS container for receiving an enteral nutrient solution, in which the handling of the container when the spike of a flexible line of a transfer device is being connected in is simplified. As well as this, it is also an object of the invention to provide a container for receiving liquids, and in particular a BFS container for receiving an enteral nutrient solution, which can be handled easily when the spike of the transfer device is being connected in.

These objects are achieved in accordance with the invention by virtue of the features given in claims 1 and 14. Preferred embodiments of the invention form the subject matter of the dependent claims.

SUMMARY OF THE INVENTION

The closure cap according to the invention for a container for receiving liquids, and in particular a BFS container for receiving an enteral nutrient solution, has a cover part and a rim part, with a withdrawal part for the withdrawal of a liquid, and in particular the enteral nutrient solution, being arranged in the cover part. Basically, the closure cap according to the invention may also comprise, as well as the withdrawal part, an injection part for the injection of a medicinal liquid into the enteral nutrient solution.

The withdrawal part of the closure cap according to the invention has a connecting part for a spike of a flexible line of a transfer device and a closing-off part having a pierceable membrane for closing-off the recess in the connecting part.

The closure cap according to the invention is distinguished by the fact that the withdrawal part has a receiving piece for receiving the spike which takes the form of an annular body which surrounds the spike and makes a seal as it does so and which is connected to the top edge of the connecting part and extends inwards into the rim part of the closure cap. This ensures that the closure cap is closed off with a seal when the membrane is punctured by the spike. It is true that the closure cap is closed off with a seal by the membrane when the spike is in the state where it is connected to the closure cap, but there is a risk of the membrane not being sealed in relation to the spike when the membrane is being punctured. The annular body which surrounds the spike and makes a seal as it does so then ensures that no enteral nutrient solution will escape from the closure cap.

In a preferred embodiment, the annular body which surrounds the spike and makes a seal as it does so is connected to the top edge of the connecting part in such a way that a narrow gap is formed between the inner wall of the connecting part and the outer wall of the annular body. As a result, the annular body is able to deform slightly when the spike is inserted and the spike is thus surrounded by the body with a seal made. The wall thickness of the annular body may be so sized, or the material of which the annular body is composed may be so selected, that the annular body is endowed with a certain elasticity.

In a further preferred embodiment, the annular body which surrounds the spike and makes a seal as it does so is of a non-circular, and in particular substantially square-cornered, cross-section and the spike, which is likewise of a square-cornered cross-section, is thus held in the annular body in such a way as to be secure against rotation. In principle, a circular cross-section is also possible, but the spike is not secured against rotation in this case.

A further preferred embodiment makes provision for the connecting part to have a substantially cylindrical portion which extends outwards from the cover part of the closure cap. Preferably, the annular body which surrounds the spike and makes a seal as it does so is connected to the top edge of the cylindrical portion of the connecting part. It is however also possible for the annular body to extend inwards from the cover part of the closure cap.

A further preferred embodiment makes provision for the substantially cylindrical portion of the connecting part to be provided with an outside thread. By this means it is possible for a spike which has a screw cap to be screwed tightly to the closure cap so that the spike is secured against slipping out.

For the pierceable membrane to be closed off aseptically, the connecting part is preferably closed off by a break-off part which is referred to as a tamper-evident part and which is connected to the top edge of the connecting part by an annular zone for fracture. Once the break-off part has been broken off or twisted off, the membrane is exposed, thus allowing the spike to be inserted.

To improve handling, the break-off part preferably has wings for gripping which project sideways from the closing-off part. The lateral wings for gripping are preferably connected to a central disc-like portion of the break-off part.

The wings for gripping preferably extend as far as the cover part of the closure cap, thus leaving only a narrow gap between the bottom edge of the wings for gripping and the cover part. This rules out the possibility of the flexible line of the transfer device being able to be trapped between the wings for gripping and the closure cap.

In a further embodiment, which is a particular preference, the closing-off part has a substantially cylindrical portion which extends inwards from the cover part of the closure cap. The pierceable membrane is seated in the cylindrical portion of the closing-off part in this embodiment.

In a further embodiment which is a particular preference, the substantially cylindrical portion of the closing-off part takes the form of a beaded-over rim which fits over the pierceable membrane and which clamps the membrane solidly in the recess in the closing-off part. This simplifies the production of the closure cap. The membrane is first inserted in the cylindrical portion of the closing-off part and the rim of the latter is then beaded over. The rim of the cylindrical portion of the closing-off part may for example be deformed thermally.

Basically, it is however also possible for the pierceable membrane to be inserted in the cylindrical portion of the closing-off part by snapping-in and/or for it to be clamped radially.

The closure cap according to the invention can be inexpensively produced in large numbers from plastics material as a one-piece injection moulding.

The container according to the invention has the closure cap according to the invention which is described above. The container preferably takes the form of a bottle, and in particular a BFS bottle, the closure cap being connected to the container with a seal. The closure cap may be bonded and/or welded to the container in this case or may take the form of a screw cap.

BRIEF DESCRIPTION OF THE DRAWINGS

An embodiment of the invention will be explained in detail below by reference to the drawings. In the drawings.

DETAILED DESCRIPTION OF THE DRAWINGS

Figure 1:
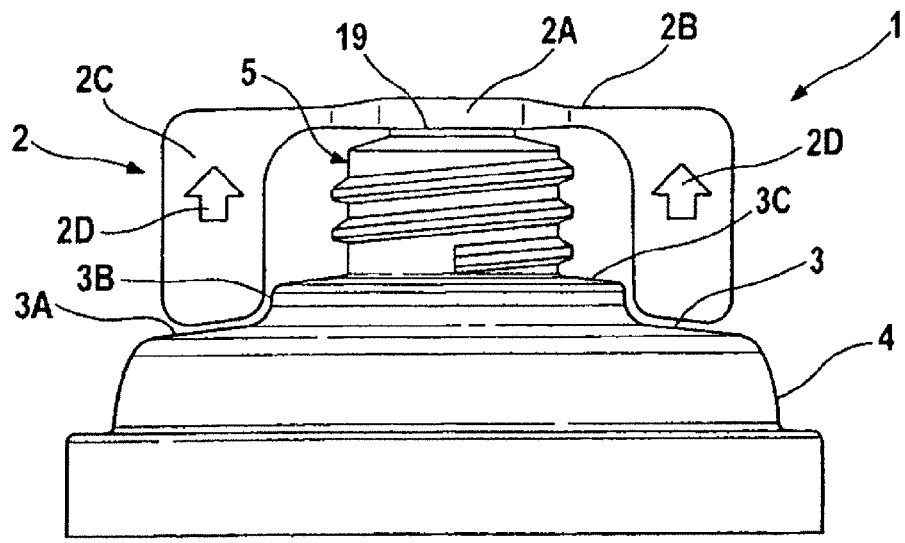
FIG. 1 is a view from the side of an embodiment of screw cap according to the invention which is closed off by the break-off part.
Figure 2:
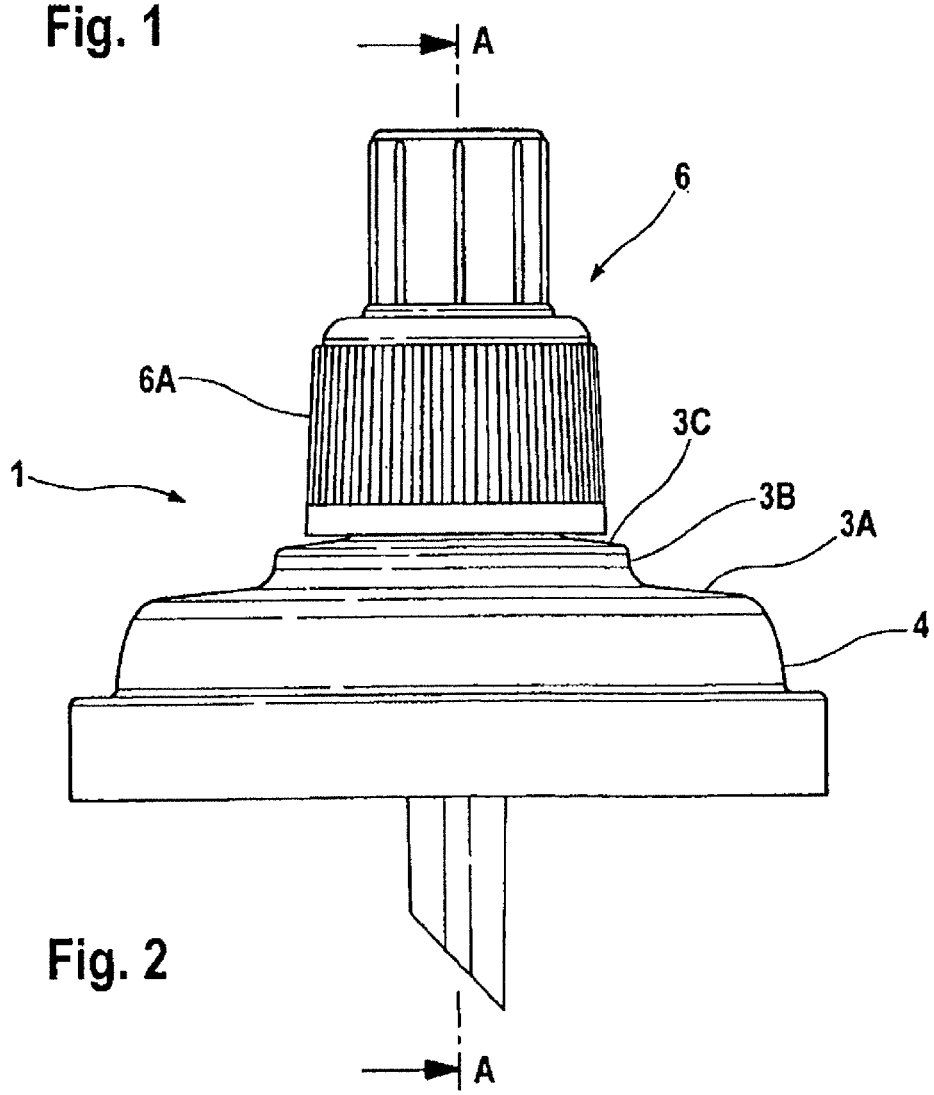
FIG. 2 is a view from the side of the closure shown in FIG. 1, the break-off part having been broken off and the spike of a flexible line of a transfer device having been screwed to the closure cap.
Figure 3:
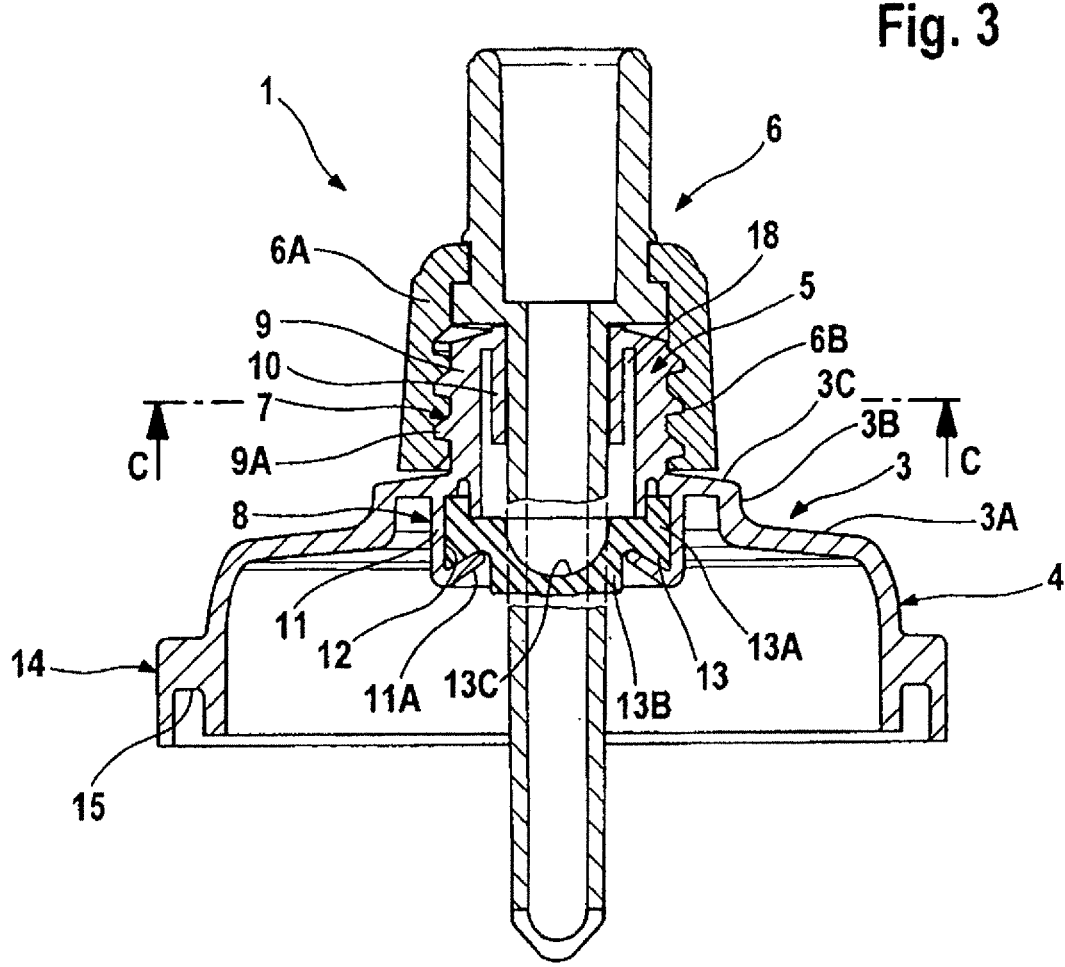
FIG. 3 is a section through the closure cap shown in FIG. 2 on line A-A.
Figure 4:
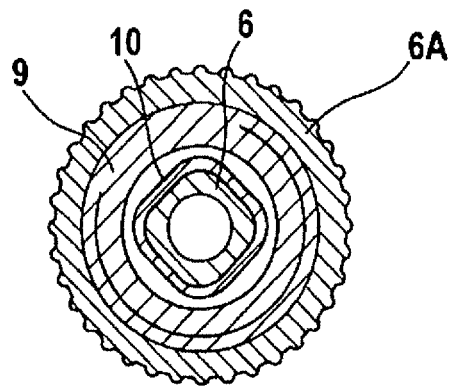
FIG. 4 is a section through the closure cap shown in FIG. 2 on line C-C.
Figure 5:
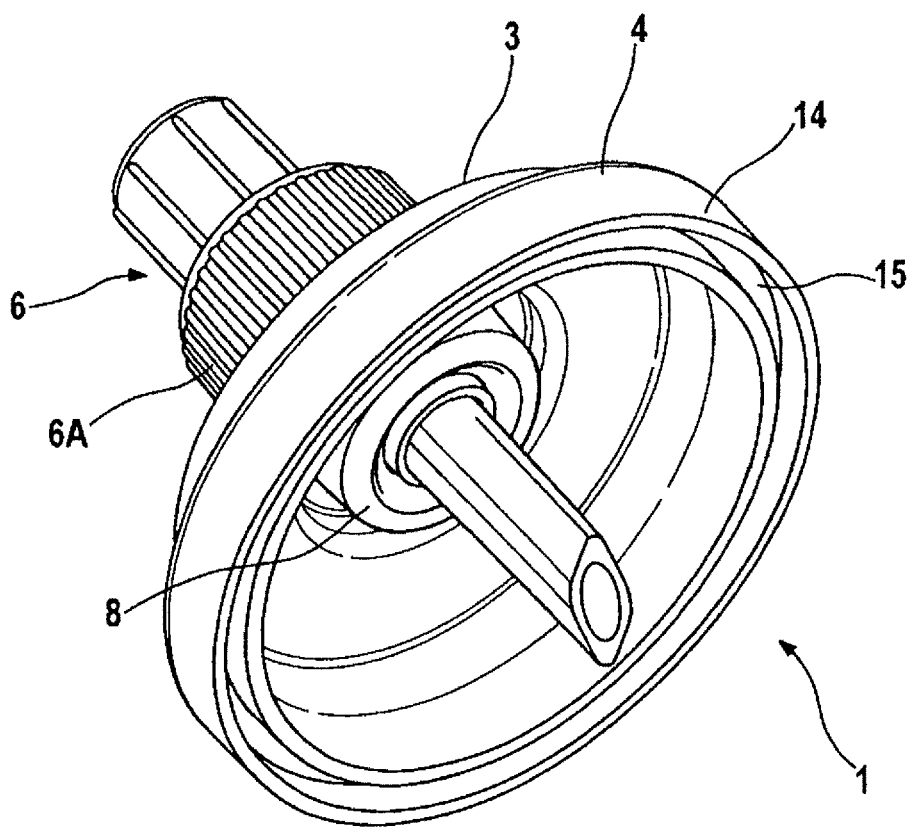
FIG. 5 is a perspective view of the closure cap shown in FIG. 2.

FIG. 1 is a view from the side of the closure cap 1 according to the invention, which is closed off with a seal by a break-off part 2. The closure cap 1 has a cover part 3 and a rim part 4. The cover part 3 has an outer portion 3A with which an inner portion 3C merges via an outwardly curved portion 3B. The inner portion 3C of the cover part 3 is provided with a withdrawal part 5 to allow a liquid, and in particular an enteral nutrient solution, to be withdrawn. The enteral nutrient solution is withdrawn by using a spike (not shown in FIG. 1) which is connected to the closure cap once the break-off part 2 has been broken off.

The closure cap will be described in detail below by reference to FIGS. 2 to 5, in which the spike 6, which is connected to one end of a flexible line (not shown) of a transfer device (not shown), has been screwed to the closure cap.

The withdrawal part 5 for withdrawing the enteral nutrient solution has a connecting part 7 and a closing-off part 8. The connecting part 7 has a substantially cylindrical portion 9 which extends outwards from the inner portion 3C of the cover part 3. Connecting up with the top edge of the cylindrical portion 9 there is an annular body 10 which extends inwards. The annular body 10 is of a substantially square cross-section which corresponds to the cross-section of the spike 6. The annular body 10, which surrounds the spike and makes a seal as it does so is integrally moulded into the top edge of the cylindrical portion 9 in such a way that a narrow gap 18 is left between the inner wall of the cylindrical portion 9 and the outer wall of the annular body 10.

The closing-off part 8 of the closure cap 1 has a substantially cylindrical portion 11 which extends inwards from the inner side of the inner portion 3C of the cover part 3. Seated in the recess 12 in the cylindrical portion 11 of the closing-off part 8 is a pierceable membrane 13. The membrane 13, which is self-sealing, has an outer, annular portion 13A and an inner portion 13B which has a bowl-like depression 13C and which is slit.

At the time of assembly, once the membrane 13 has been inserted in the cylindrical portion 11 the bottom rim 11A of the latter is bent over and the bottom rim 11A thus fits under the membrane 13. The outer portion 13A of the membrane 13 is thus held in the recess 12 in the closing-off part 8 by a clamping action.

The rim part 4 of the closure cap 1 has a bottom bulged edge 14 which has in its underside a groove 15 extending round in a circle. The closure cap can be fitted onto a bottle, in which case the top edge of the neck of the bottle fits into the groove in the bulged edge of the closure cap.

The closure cap 1 has had the spike 6 screwed to it. The spike 6 has a ring nut 6A which is secured in such a way as to be unlosable and which has an inside thread 6B, while the outer wall of the cylindrical portion 9 of the connecting part 7 is provided with a corresponding outside thread 9A, thus enabling the ring nut 6A to be screwed onto the connecting part 7 of the closure cap 1.

The closure cap 1 is sealed off not only by the membrane 13 but also by the annular portion 10 which surrounds the spike 6 and makes a seal as it does so. This ensures that enteral solution itself cannot escape when the spike is being inserted in the withdrawal part of the closure cap.

Before the enteral nutrient solution is withdrawn, the closure cap 1 is in a state where it is closed off with a seal by the break-off part 2 (FIG. 1). The break-off part 2 has an inner, disc-like portion 2A which is connected to the top edge of the cylindrical portion 9 of the connecting part 7 by an annular zone 19 for fracture. Connected to the inner disc-like portion 2A of the break-off part 2 via narrow fillets 2B are two wings for gripping 2C which project on two sides. The wings for gripping 2C are in the form of flat bodies which width is equal to the width of the outer portion 3A of the cover part 3. The wings for gripping 2C extend as far as the outer portion 3A of the cover part 3, with a narrow gap being left between the bottom edge of the wing for gripping 2C and the upper side of the outer portion 3A of the cover part 3. Both the wings for gripping 2C have a cut-out in the form of an outward pointing arrow to identify the closure cap as a withdrawal part.

Figure 6:
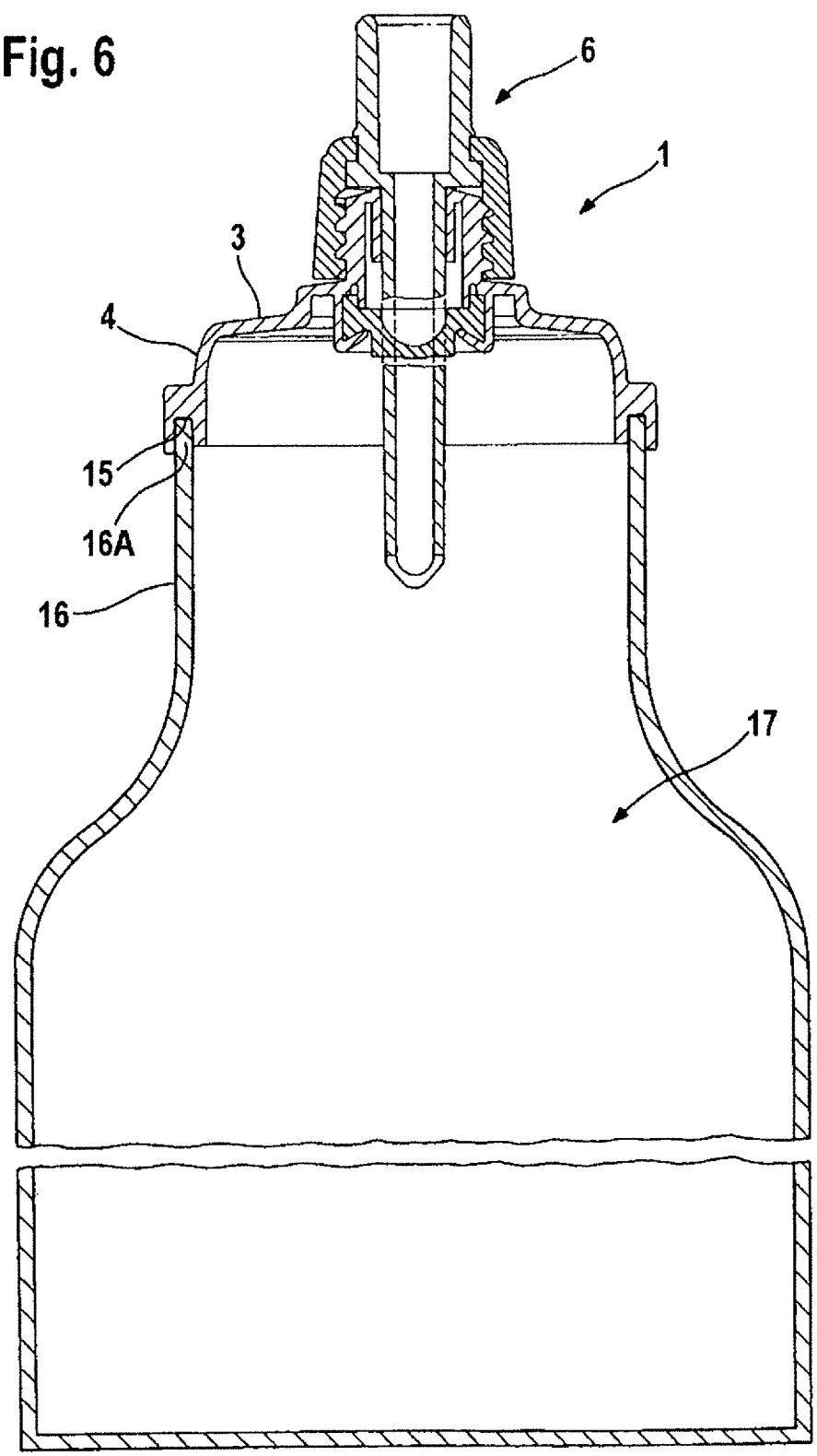
FIG. 6 shows an embodiment of container according to the invention having the closure cap according to the invention.

FIG. 6 shows the closure cap according to the invention together with a container according to the invention, which in the present embodiment is a BFS bottle. The closure cap 1 is firmly seated on the neck 16 of the bottle 17, the latter being filled with an enteral nutrient solution. The closure cap 1 is welded to the neck 16 of the bottle, with the top edge 16A of the neck of the bottle fitting into the groove 15 in the bulged edge 14 of the closure cap.

The invention claimed is:

1. An apparatus comprising:
    a closure cap for a container for receiving a liquid for enteral nutrition, said closure cap including:
    a rim part having a shape adapted to fit onto the top of the container;
    a cover part having a first end attached to the rim part;
    a withdrawal part for the withdrawal of a liquid, said withdrawal part attached to a second end of the cover part and having:
    a connecting part with an annular body for receiving and holding a spike of a flexible line of a transfer device; and
    a closing-off part attached to the second end of the cover part;
    a pierceable self-sealing slit membrane disposed within the closing-off part at the second end of the cover part,
    wherein said annular body is connected to a top edge of said connecting part and extends inwards into said connecting part in such a way that, when the self-sealing slit membrane is punctured by the spike, the closure cap is sealed off not only by the self-sealing slit membrane but also by the annular body; and
    wherein the annular body is spaced from the self-sealing slit membrane by a distance such that, during penetration of the self-sealing slit membrane by the spike, the annular body surrounds said spike and makes a seal by surrounding said spike.

2. The apparatus of claim 1, wherein said annular body is connected to the top edge of said connecting part in such a way that a transverse section of said closure cap along a plane that intersects both the connecting part and the annular body shows a narrow gap formed between the inner wall of said connecting part and the outer wall of said annular body.

3. The apparatus of claim 2, wherein said annular body, which surrounds said spike and makes a seal as it does so, has a square-cornered cross-section.

4. The apparatus of claim 1, wherein said connecting part has a cylindrical portion that extends outwards from said cover part.

5. The apparatus of claim 4, wherein said annular body, which surrounds said spike and makes a seal as it does so, is connected to the top edge of said cylindrical portion of said connecting part.

6. The apparatus of claim 4, wherein said cylindrical portion of said connecting part is provided with an outside thread.

7. The apparatus of claim 1, wherein said connecting part is closed off by a break-off part or twist-off part that is connected to the top edge of said connecting part by an annular zone for fracture.

8. The apparatus of claim 7, wherein said break-off part comprises a central disc-like portion including wings for gripping, wherein said wings project sideways from said disc-like portion.

9. The apparatus of claim 8, wherein said wings for gripping extend as far as said cover part of the closure cap.

10. The apparatus of claim 1, wherein said closing-off part comprises a cylindrical portion that extends inwards from the interior of an inner portion of said cover part, said pierceable self-sealing slit membrane being seated in said cylindrical portion of said closing-off part.

11. The apparatus of claim 10, wherein the bottom rim of said cylindrical portion of said closing-off part further comprises a beaded-over rim extending toward the second end of the cover part, the beaded-over rim fitting under an outer portion of said pierceable self-sealing slit membrane.

12. The apparatus of claim 10, wherein said cover part has an outer portion with which an inner portion merges via an outwardly curved portion, wherein said cylindrical portion of said closing-off part connects to said inner portion of said cover part.

13. The apparatus of claim 1, wherein said closure cap is a one-piece injection molded piece.

14. The apparatus of claim 1, further comprising a container, wherein said container comprises a BFS bottle, and wherein said closure cap is a closure cap for said container.

15. The apparatus of claim 1, wherein said rim part has a bottom bulged edge, wherein the bottom bulged edge has an underside, wherein a groove in said underside extends around in a circle, whereby the closure cap is adapted to fit onto the top of the bottle via the top edge of the neck of the bottle fitting into the groove in the bulged edge of the closure cap.

16. The apparatus of claim 1, wherein said rim part is cylindrical.

17. The apparatus of claim 1, wherein said closure cap is welded to said container.

18. An apparatus for receiving a spike that is connected to a flexible line that leads to a transfer device thereby enabling said spike to tap liquid enteral solution through a top of a container containing said liquid enteral solution, said apparatus comprising a cap, said cap comprising
    a rim,
    a cover, and
    a withdrawal-part,
    wherein said rim fits said top,
    wherein said cover comprises first and second ends,
    wherein said rim and said first end are attached,
    wherein said withdrawal part and said second end are attached,
    wherein said withdrawal part comprises a connecting part and a closing-off part,
    wherein said second end and said closing-off part are attached,
    wherein said connecting part comprises a top edge and a first seal,
    wherein said closing-off part comprises a second seal,
    wherein said second seal is disposed at said second end,
    wherein said second seal comprises a membrane,
    wherein said membrane comprises a slit,
    wherein said slit is sized to accommodate said spike,
    wherein upon withdrawal of said spike from said slit said slit re-forms a seal,
    wherein said first seal comprises a body having a wall that forms a hole,
    wherein said hole is sized to form a seal when said spike passes through said hole,
    wherein said body is connected to said top edge,
    wherein said body extends inward into said connecting part by a distance,
    wherein said distance is selected such at least one of said first and second seals is in a sealing state regardless of a location of said spike.

19. The apparatus of claim 18, wherein said sealing body comprises four walls that define an outer surface thereof, said four walls meeting to form four rounded corners.

20. The apparatus of claim 18, wherein said sealing body comprises an outer surface, wherein said connecting part comprises an inner surface, and wherein a gap exists between said outer surface and said inner surface.

21. The apparatus of claim 18,
- wherein said connecting part comprises a cylindrical portion having a first end and a second end,
- wherein said sealing body comprises a first end and a second end,
- wherein said first end of said cylindrical portion is disposed at said cover,
- wherein said second end of said cylindrical portion is disposed at said first end of said sealing body, and
- wherein said second end of said sealing body is closer to said cover than said first end of said sealing body.

* * * * *